United States Patent [19]

Meyer

[11] Patent Number: 5,335,118
[45] Date of Patent: Aug. 2, 1994

[54] DISC DRIVE WITH WRITE PRECOMPENSATION USING WINDOW/PULSE TIMING MEASUREMENTS

[75] Inventor: Forrest C. Meyer, Eden Prairie, Minn.

[73] Assignee: Seagate Technology, Inc., Scotts Valley, Calif.

[21] Appl. No.: 918,676

[22] Filed: Jul. 22, 1992

[51] Int. Cl.5 .................................................. G11B 5/09
[52] U.S. Cl. .................................................. 360/51
[58] Field of Search ................. 360/51, 45, 32, 46; 324/212; 307/234, 261, 517, 519

[56] References Cited

U.S. PATENT DOCUMENTS

| | | | |
|---|---|---|---|
| 3,835,383 | 9/1974 | Crofford | 324/186 |
| 3,997,876 | 12/1976 | Frush | 340/172.5 |
| 4,173,027 | 10/1979 | Rathbun | 360/45 |
| 4,205,352 | 5/1980 | Tomada | 360/45 |
| 4,245,263 | 1/1981 | Rathbun et al. | 360/45 |
| 4,281,356 | 7/1981 | Sousa | 360/45 |
| 4,334,250 | 6/1982 | Theus | 360/45 |
| 4,481,549 | 11/1984 | Theus | 360/45 |
| 4,578,721 | 3/1986 | Brannan, Jr. | 360/51 |
| 4,584,489 | 4/1986 | Tanaka | 307/264 |
| 4,607,295 | 8/1986 | Uno | 360/45 |
| 4,691,254 | 9/1987 | Cloke | 360/45 |
| 4,714,968 | 12/1987 | Troletti | 360/51 |
| 4,716,475 | 12/1987 | Dutcher | 360/45 |
| 4,772,843 | 9/1988 | Asaka et al. | 320/1 |
| 4,809,088 | 2/1989 | Lofgren et al. | 360/31 |
| 4,885,645 | 12/1989 | Hashimoto | 360/45 |
| 4,908,722 | 3/1990 | Sonobe | 360/46 |
| 4,914,530 | 4/1990 | Graham et al. | 360/48 |

Primary Examiner—John Shepperd
Assistant Examiner—Patrick Wamsley
Attorney, Agent, or Firm—Kinney & Lange

[57] ABSTRACT

A peak shift detection circuit receives digitized read data and provides a temporal measurement output representative of peak shift of data pulses read from a magnetic storage medium. A random data pattern is written upon the magnetic storage medium. The peak shift detection circuit uses a precision delay circuit to delay a digitized read data signal. The delay signal is applied to a linear ramp circuit. The linear ramp circuit triggers the charging of a capacitor through a constant current source. This generates a linear ramp which is applied to a flash analog-to-digital converter. The conversion by the flash analog-to-digital is triggered by a generated data window signal. The digitized output of the flash analog-to-digital converter is applied to a time conversion circuit. The output of this circuit is a temporal measurement of the spacing between a data pulse and the following edge of a data window. This time measurement is then used to calculate the amount of write precompensation necessary to correct peak shifting.

20 Claims, 4 Drawing Sheets

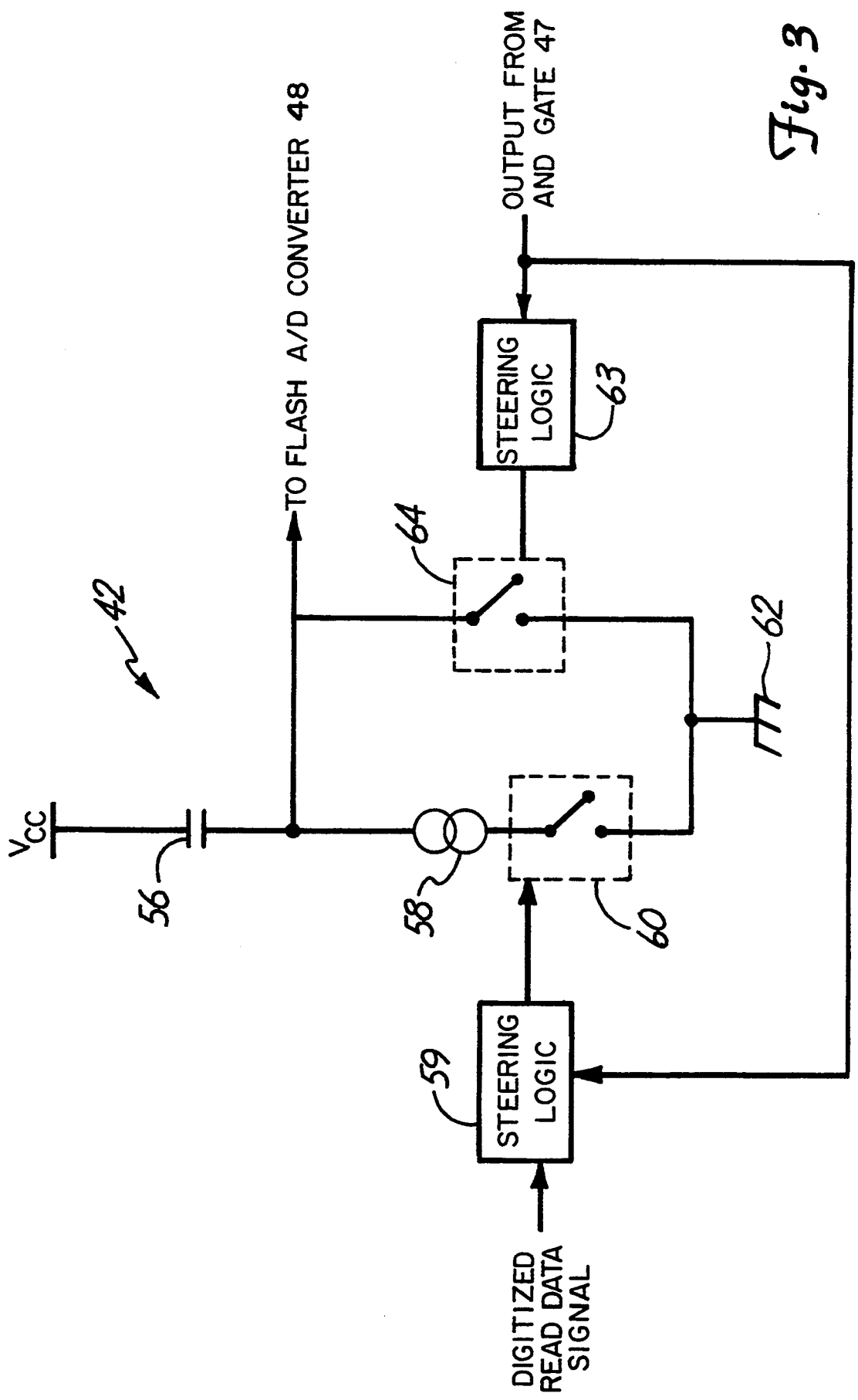

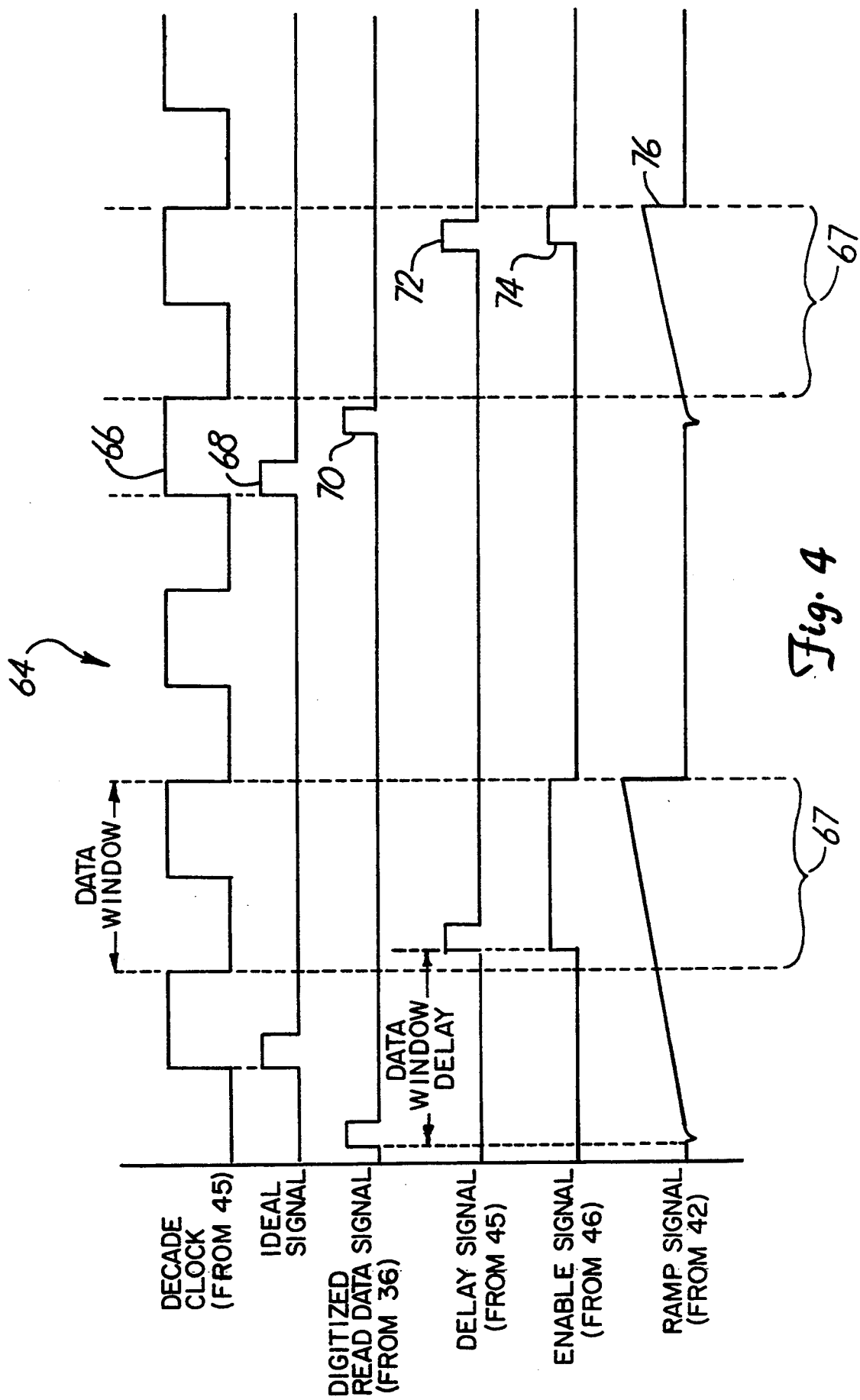

DISC DRIVE WITH WRITE PRECOMPENSATION USING WINDOW/PULSE TIMING MEASUREMENTS

BACKGROUND OF THE INVENTION

The present invention relates to selecting an amount of write precompensation in a magnetic storage system. In particular, the present invention measures the time between a location of a data pulse in a window and a following edge of that window during readback from the storage system.

In a magnetic storage (disc drive) system, digital information is magnetically stored upon a magnetic medium on the surface of a rotating magnetic disc. The digital information is represented by selectively polarizing the magnetic field of consecutive areas across the surface of the rotating magnetic disc. When this information is read back from the disc, the magnetic polarization of the medium is sensed and converted into an electrical output signal. This reading operation is done through the magnetic read/write head, which is suspended over the surface of the rotating disc and which provides a raw data signal. The raw data signal is representative of the relative strength of the magnetic flux density present on the magnetic disc.

The raw data signal comprises a series of data "peaks" whose location is used to represent digital information. With high data storage densities, the precise location of a data peak becomes critical because adjacent data peaks are spaced very close together. If a data peak is shifted slightly in time, incorrect information may be read back.

In recording on a magnetic storage system, magnetic dipoles contained in the disc medium are moved past a read/write head. The read/write head consists of an electromagnet with highly focused fringing fields. The magnetic field due to the read/write head current aligns the dipoles in one direction or another representing digital bits. However, the magnetic field of the read/write head extends somewhat over several bit locations. This over-extension of the magnetic field causes adjacent data peaks to be shifted from their respective center positions. Shifting due to the interaction of neighboring bits is referred to as "peak shift." To eliminate the effects of peak shift on subsequent data recovery, the write data is typically precompensated during the recording process. This is done by advancing or delaying the write signal depending on the data pattern and the track radius. This process is referred to as "write precompensation" and is described in U.S. Pat. No. 4,809,088 incorporated herein by reference.

During recovery of the recorded data signal, a data window signal is also generated. The data window signal is generated based upon the data signal using a phase-locked loop. Under ideal conditions, the data window signal is in-phase with the data signal itself, such that each data pulse is located at the center of the window. However, data pulses tend to move away from the center of the data window due to interference from adjacent pulses, also known as peak shifting.

A common technique employed to determine the required precompensation is window margining analysis. This process continually measures the average error rate as the window width and write precompensation are varied. If one measures timing errors with respect to different window sizes, precompensation for the appropriate window size can be selected to provide the lowest error rate. However, this process will not measure the exact spacing of each data pulse within the window. This process confirms whether the data pulse has been moved into the window, but does not provide information on where the data pulse lies within the window.

Alternatively, complex test equipment can measure the individual distances between data pulses and the center of a window. However, the art lacks a simple and accurate method and apparatus for measuring the spacing between a location of a data pulse in a window and a following edge of that window.

SUMMARY OF THE INVENTION

The present invention is a means for determining the amount of write precompensation required in a magnetic disc drive storage system. This compensation amount is a measurement based upon the spacing between a data pulse (depending on a pattern) in a data window and a following edge of that window.

A random data pattern is written upon the surface of the magnetic storage medium under test. When this pattern is read back, any shifts in data peaks may be determined. Precompensation is then selected and used to correct these shifts.

The present invention measures the spacing between the first data pulse within the window and the following window edge by using a capacitor, a constant current source and a flash analog-to-digital converter. The current source is triggered upon detection of a data pulse in a data window which initiates the charging of the capacitor. The voltage across the capacitor is directly related to time. The flash analog-to-digital converter is then triggered when an edge of the window following detection of the data pulse is detected. When triggered, the flash analog-to-digital converter converts the voltage present across the capacitor to a digital value. This value is representative of the temporal spacing between data pulse and the data window edge.

After the flash analog-to-digital converter converts the voltage on the capacitor to a digital value, the capacitor is discharged. This allows the capacitor to begin charging from zero using the constant current source upon the detection of the next data pulse.

BRIEF DESCRIPTION OF THE DRAWINGS

FIG. 3 is an electrical circuit diagram of a linear ramp generator as shown in FIG. 2.

FIG. 4 is a timing diagram of the signals in the circuits of FIG. 2.

DETAILED DESCRIPTION OF THE PREFERRED EMBODIMENTS

The present invention is a means for determining the actual amount of write precompensation required in a magnetic disc drive storage system. This is achieved by measuring the time between a data window edge and a data pulse within a data window. Interference with neighboring data pulses causes the position of data pulses to shift relative to data windows. This shift is measured by charging a capacitor upon detection of a data pulse within a data window until the detection of the edge of a data window. The voltage on the capacitor at that point is representative of the time shift of the data pulse. This may be used to determine the precise amount of precompensation required in that magnetic storage medium device.

Figure 1:
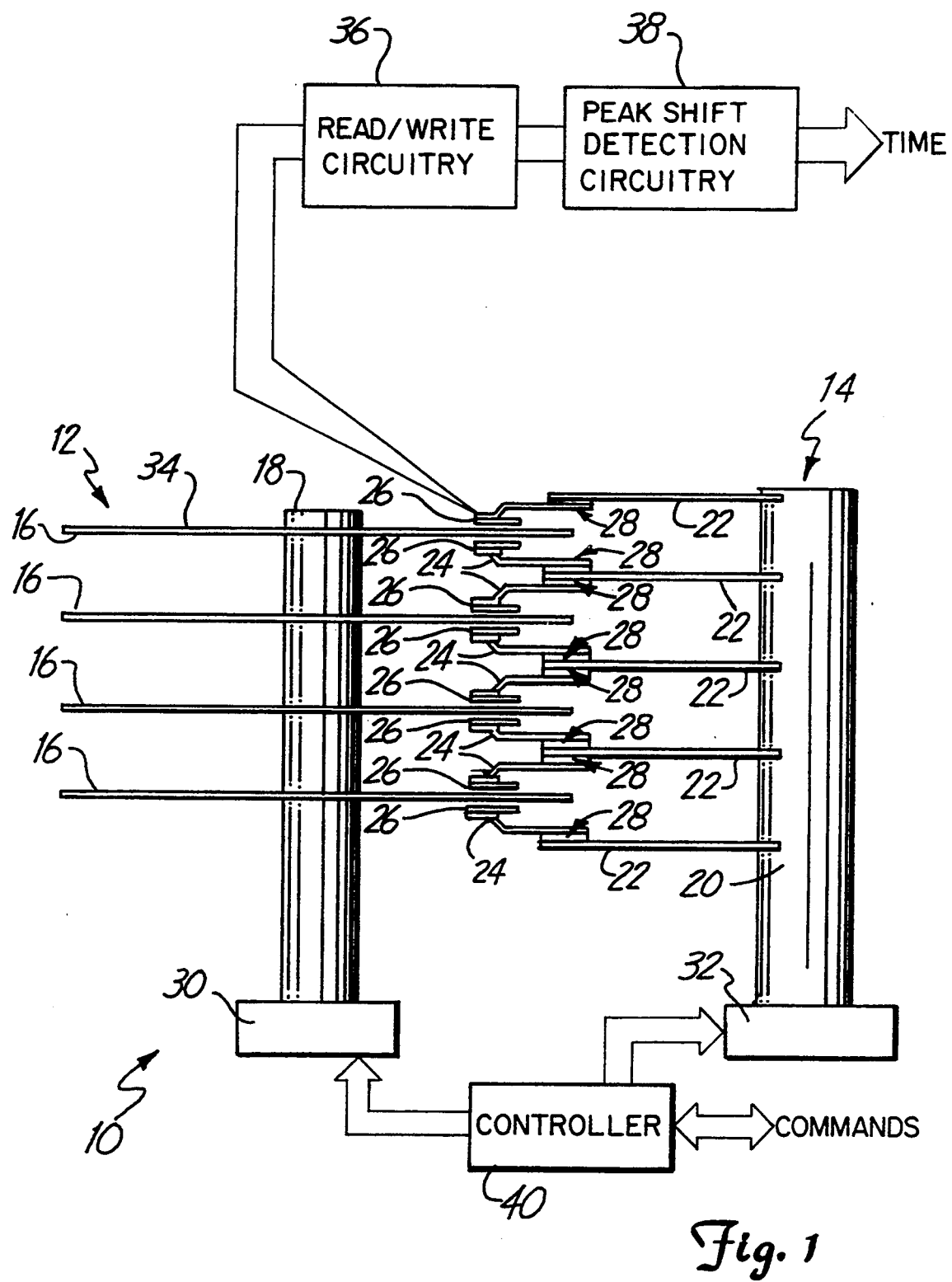
FIG. 1 shows a magnetic disc storage system which includes peak shift detection circuitry in accordance with the present invention.

Disc drive assembly 10, shown in FIG. 1, comprises disc pack 12 and E-block assembly 14. Disc pack 12 comprises discs 16 stacked on drive spindle 18. E-block assembly 14 comprises servo-spindle 20 and a plurality of support arms 22. Each support arm carries one or two flexure arms 24. Each flexure arm 24 carries a magnetic head assembly 26. Each flexure arm 24 mounts to its corresponding support arm 22 by a mount 28. Spindle motor 30 is coupled to drive spindle 18, and actuator 32 is coupled to servo-spindle 20.

Read/write circuitry 36 is connected to magnetic head assembly 26. Read/write circuitry 36 provides a digitized read data signal to peak shift detection circuitry 38. Peak shift detection circuitry 38 provides peak shift information in accordance with the present invention. Controller 40 receives commands (for example, "seek" or "write") and controls operation of disc drive assembly 10. Controller 40 is connected to spindle motor 30 and actuator 32.

In operation, motor 30 rotates drive spindle 18 which causes discs 16 to rotate in unison. Actuator 32 moves servo-spindle 20 so that magnetic head assemblies 26 move between data tracks on disc 16. Read/write circuitry 36 converts a raw data signal from a magnetic head assembly 26 into digitized read data. The output of the read/write circuitry 36 is applied to peak shift detection circuitry 38. Controller 40 receives commands and controls operation of spindle motor 30 and actuator 32.

Figure 2:
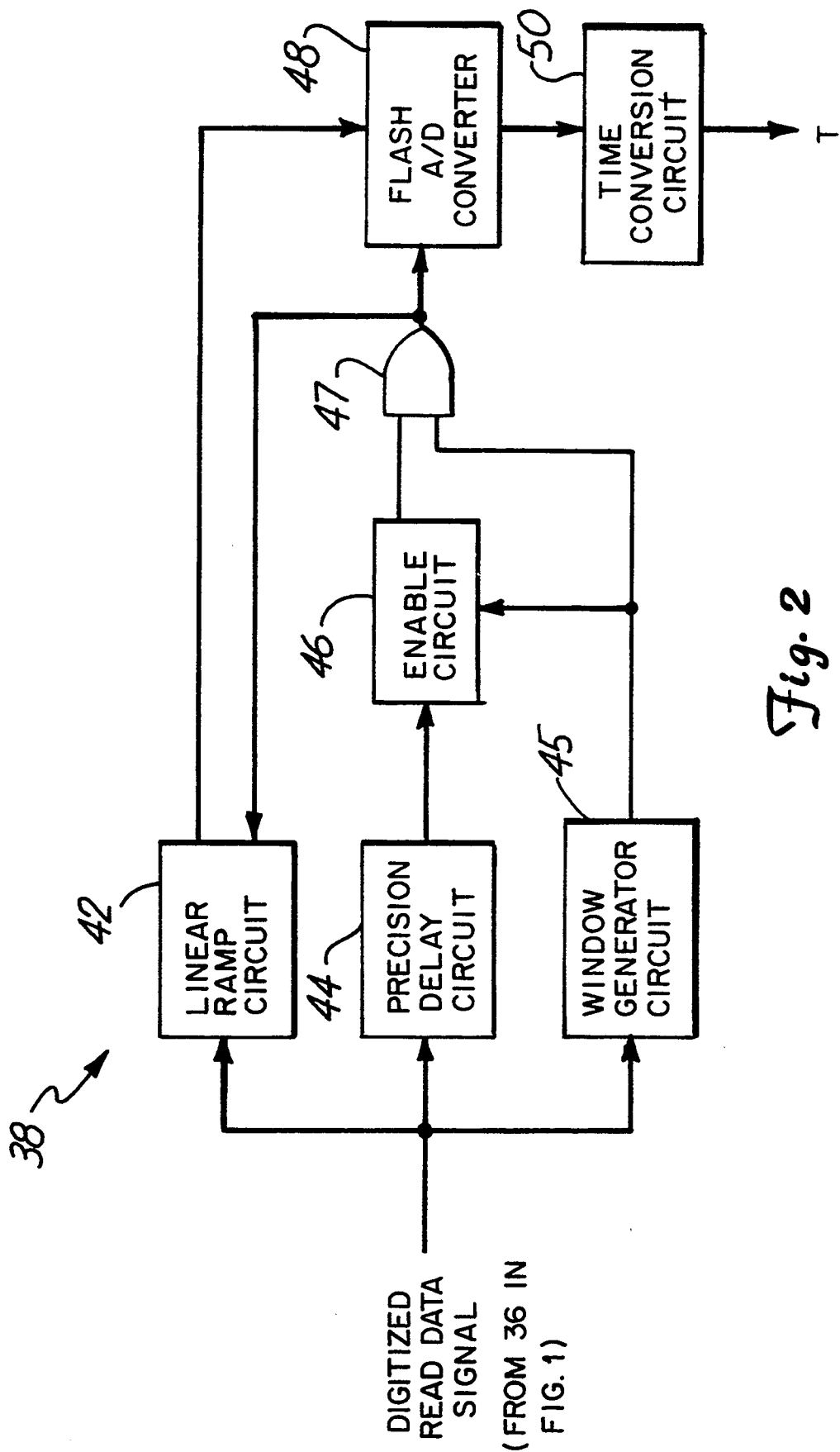
FIG. 2 shows a block diagram of the circuit for determining peak shift of information pulses in a magnetic storage medium in accordance with the present invention.

FIG. 2 is a block diagram of peak shift detection circuitry 38 made in accordance with the present invention. In FIG. 2, a digitized read data signal is applied to linear ramp circuit 42, precision delay circuit 44, and window generator circuit 45. The output of precision delay circuit 44 is received by enable circuit 46. Enable circuit 46 also receives a signal from window generator circuit 45. The output of enable circuit 46 and the output of window generator circuit 45 are both applied to AND gate 47. The output of AND gate 47 is applied to the trigger of flash analog-to-digital converter 48 and to linear ramp circuit 42. The output of linear ramp circuit 42 is applied to flash analog-to-digital converter 48. The output of flash analog-to-digital converter 48 is received by time conversion circuit 50.

FIG. 3 is a simplified electrical schematic diagram of linear ramp circuit 42. Schematic diagram 42 includes power supply Vcc, capacitor 56, current source 58, steering logic 59, steering logic 63, switch circuits 60 and 64, and electrical ground 62. Capacitor 56 is connected between power supply Vcc and current source 58. The other side of current source 58 is connected to switch circuit 60, which is controlled by steering logic 59. Steering logic 59 receives the digital read data signal from the output of read back circuitry 36. It also receives a signal from the output of AND gate 47. Switch circuit 64 is connected between the capacitor 56 and electrical ground 62. Switch circuit 64 is controlled by steering logic 63. Steering logic 63 receives a signal from the output of AND gate 47.

FIG. 4 is a timing diagram 64 of data signals in peak shift detection circuitry 38 of FIG. 2. FIG. 4 is a graph of signal values versus time. The output of window generator circuit 45 is shown as data window signal 66. The dashed lines indicate data windows 67. Idealized digital read data signal 68 (without any intersymbol or other interference) is shown as a reference. Actual digitized read data signal 70 is shown relative to idealized read data signal 68. Also shown relative to digitized data signal 70 are delayed data signal 72 and enable signal 74. The output of linear ramp circuit 42 from FIG. 2 is shown as ramp signal 76.

In operation, a random data signal is written on surface 34 of disc 16 by read/write circuitry 36. Typically, data is stored on a magnetic storage system using a nonreturn to zero (NRZ) code. In reading signals encoded with the NRZ code, data pulses are detected only upon changes from one-to-zero or from zero-to-one. A string of only ones or of only zeros produces no signals. Thus, it is critical to have accurate clocking in the controller to allow accurate separation of ones from zeros. During testing, read/write circuitry 36 receives a weak read signal from magnetic transducer 26. This is amplified and converted into digitized read data by the read/write circuitry 36. Each digital pulse in the output from read/write circuitry 36 represents a bit of digitized information. In other words, a bit of information on surface 34 of magnetic storage disc 16 is represented by a change in the magnetic flux of surface 34.

The output of read/write circuitry 36 comprises a digitized read data signal which is applied to peak shift detection circuitry 38. Digitized read data signal 70 provided from read/write circuitry 36 is received by linear ramp circuit 42, precision delay circuit 44, and window generator circuit 45.

The data pulses in digitized read data signal 70 from read/write circuitry 36 will often be shifted in time due to peak shift. They tend to move away from the center of data window 67 to the edges of data window 67. This is shown by comparing digitized read data signal 70, ideal signal 68, and decode clock signal 66 in FIG. 4. Digitized read data signal 70 shows how the first data pulse has shifted to the leading edge of data window 67 and the second pulse has shifted to the trailing end of data window 67.

Precision delay circuit 44 is used to delay data pulses in digitized read data signal 70 so that an accurate measurement may be made of the distance between the data pulse and the edge of a data window. This delay will allow an accurate measurement to be made regardless of whether the data pulse has shifted to the leading or to the trailing edge of the window. Delaying these data pulses allows linear ramp circuit 42 adequate time to generate a measurable voltage when flash analog-to-digital converter 48 is triggered. When actual time shift is calculated, the amount of delay introduced by precision delay circuit 44 is subtracted from the calculation.

The delayed pulses from precision delay circuit 44 are introduced to enable circuit 46. Each delayed pulse activates the enable signal 46, which remains enabled until an edge of data window 67 is detected. The output of enable circuit 46 and the output of window generator circuit 45 are both introduced to AND gate 47. The output of AND gate 47 is then introduced to both flash analog-to-digital converter 48 and to linear ramp circuit 42.

Window generator circuit 45 uses a phase-locked loop which produces time average clocked windows. Although the frequency of the data at the input of window generator circuit 45 will vary, the output frequency is relatively constant. Each data window of the output from window generator circuit 45 is identical and has a period which is referred to as a "T-time." Ideally, each data pulse falls in the center of each of these data windows. This is shown by comparing ideal data signal 66 with data windows 67 in FIG. 4. Each window edge following a data pulse will trigger the flash analog-to-digital converter 48.

The digitized read data signal received from read/write circuitry 36 is also introduced to linear ramp circuit 42. Within linear ramp circuit 42, this digitized signal is introduced to steering logic 59 shown in FIG. 3. Steering logic 59 controls switch 60 based upon both the signals received from the read/write circuitry 36 and from the output of AND gate 47. Steering logic 59 will close switch 60 when a data pulse is received from read/write circuitry 36 which enables constant current source 58, thereby initiating the charging of capacitor 56. Capacitor 56 will continue to charge at a constant rate until steering logic 59 opens switch 60 upon receiving a signal from the output of AND gate 47. Each signal received from AND gate 47, which represents a window edge detected while the enable circuit 46 is enabled, opens switch 60.

The output signal from AND gate 47 is input to steering logic 63. Steering logic 63 controls switch 64 and will close switch 64 upon each pulse received from AND gate 47. Data pulses from read/write circuitry 36, along with trigger signals from AND gate 47, produce a ramp-like voltage on capacitor 56. Ramp signal 74 is input to flash analog-to-digital converter 48. This voltage will then be converted to a digital representation when flash analog-to-digital converter 48 is triggered. The triggering of flash analog-to-digital converter 48 is controlled by AND gate 47.

Each time AND gate 47 triggers flash analog-to-digital converter 48, a digital signal is output from converter 46 to time conversion circuit 50. This digital signal is a binary-weighted signal which represents a voltage on capacitor 56 at the moment flash analog-to-digital converter 48 is triggered. This voltage is representative of the physical (and therefore temporal) spacing between a data pulse and the window edge of data window 67 within which that data pulse was located.

Time conversion circuit 50 converts the digital signal to a precise measurement of time. Since the capacitance of capacitor 56 is known, as is the current generated by constant current source 58, the time can be directly calculated by the change in voltage. This is through the following formula:

Equation 1:

$$T = \frac{CV}{I} - T_{delay}$$

where T is time, C is capacitance, V is voltage, I is current and $T_{delay}$ is the delay introduced by precision delay circuit 44.

The peak shift information is provided to read/write circuitry 36 and is used for precompensation during a write operation. The information can be stored as data disc 34. During operation, the information can be read back and used for precompensation.

The present invention provides an inexpensive and accurate method and apparatus for measuring the temporal spacing between a data pulse and the edge of a data window within which that data pulse is located. This measurement is used to determine the amount of write precompensation necessary to adjust the data pulse to the data window's center. The invention uses a precision delay circuit to delay the digitized read data signal. The delay signal is applied to a enable circuit. This signal is then coupled with a generated data window signal and sent to an AND gate. The data window signal is generated from the digitized read data signal. The AND gate triggers the charging of a capacitor. The charging is through a constant current source. This generates a linear ramp which is applied to a flash analog-to-digital converter. The conversion by the flash analog-to-digital converter is directly triggered by the AND gate. The digitized output of the flash analog-to-digital converter is applied to a time conversion circuit. The time measurement is then used to calculate the precise amount of write precompensation necessary to correct peak shifting.

Although the present invention has been described with reference to preferred embodiments, workers skilled in the art will recognize that changes may be made in form and detail without departing from the spirit and scope of the invention.

What is claimed is:

1. An apparatus for measuring spacing between a data pulse and a following edge of a data window in a magnetic storage system including a magnetic storage media and a magnetic head, comprising:
   a capacitor;
   means coupled to the capacitor for charging the capacitor;
   an analog-to-digital converter connected to the capacitor for converting a voltage on the capacitor to a digital value;
   charge controller means, coupled to the means for charging the capacitor, for triggering charging of the capacitor upon detection of a data pulse from a first electrical signal; and
   converter controller means, coupled to the analog-to-digital converter, for triggering conversion of the voltage on the capacitor to the digital value upon detection of an edge of a data window from a separate and distinct second electrical signal immediately following a data pulse.

2. The apparatus of claim 1 wherein the means for charging the capacitor comprises a constant current source whereby the capacitor provides a linear ramping voltage signal level.

3. The apparatus of claim 1 including reset means for resetting a voltage on the capacitor following analog-to-digital conversion.

4. The apparatus of claim 3 wherein the reset means comprises steering logic for receiving data pulses and a switch connected between the capacitor and electrical ground.

5. The apparatus of claim 1 wherein the converter controller means includes means for generating data windows based upon data pulses using a phase-locked loop.

6. A method of measuring spacing between a data pulse and a following edge of a data window in a magnetic system, comprising:
   reading a data signal from a magnetic medium of the magnetic storage system;
   charging a capacitor in response to detection of a data pulse in the data signal;
   converting a voltage on the capacitor into a digital value in response to detection of an edge of a window signal subsequent to the data pulse; the data window signal being different from the data signal; and converting the digital value to a time measurement representative of time between detection of the data pulse and detection of the edge of the data window signal.

7. The method of claim 6 including using the time measurement to write precompensate data in the magnetic storage system.

8. An apparatus for providing a time measurement representative of time between a data pulse and an edge of a data window signal generated in a magnetic storage system, comprising:

a capacitor;

means for electrically charging the capacitor;

initiating means, coupled to the means for electrically charging the capacitor, for initiating charging on the capacitor in response to a data pulse in a data signal, the initiating means comprising steering logic responsive to the data pulse and a switch connected to the means for electrically charging the capacitor; and analog-to-digital converter means connected to the capacitor for converting a voltage level developed across the capacitor into a digital signal representation of the voltage level in response to the edge of a data window signal which is different from the data signal, whereby the digital signal is related to time between the data pulse and the edge of the data window signal.

9. The apparatus of claim 8 wherein the means for electrically charging the capacitor comprises a constant current source.

10. The apparatus of claim 8 including means for discharging the capacitor following analog-to-digital conversion of the voltage on the capacitor.

11. The apparatus of claim 8 including means for converting the digital signal into a value representing time.

12. The apparatus of claim 8 including means for writing information onto a magnetic storage medium relating to the digital value.

13. An apparatus for determining an amount of write precompensation for a magnetic storage medium in a magnetic storage system, comprising:

a magnetic head for reading information from a surface of the magnetic storage medium and providing an output signal comprising data pulses;

delay circuitry connected to the magnetic head for delaying data pulses and having a delayed pulse output;

a window generator circuit connected to the magnetic head and having a data window output;

enable circuit means connected to data window output and the delayed pulse output for generating an enable signal in response to a delayed data pulse and a data window;

linear signal generating means connected to the magnetic head for generating a linearly changing signal in response to detection of a data pulse; and analog-to-digital converter means connected to linear signal generating means and the enable circuit means whereby the linearly changing signal is converted into a digital value in response to the enable signal.

14. The apparatus of claim 13 wherein the linear signal generating means comprises a capacitor connected to a constant current source and the linearly changing signal is a ramping voltage signal.

15. The apparatus of claim 13 including means for converting the digital value into a value representative of time.

16. An apparatus for measuring spacing between a data pulse and a following edge of a data window in a magnetic storage system including a magnetic storage media and a magnetic head, comprising:

a capacitor;

means coupled to the capacitor for charging the capacitor;

an analog-to-digital converter connected to the capacitor for converting a voltage on the capacitor to a digital value;

charge controller means, coupled to the means for charging the capacitor, for triggering charging of the capacitor upon detection of a data pulse; and delay circuitry coupled between the magnetic head and the charge controller means for delaying data pulses from the magnetic head; and converter controller means, coupled to the analog-to-digital converter, for triggering conversion of the voltage on the capacitor to the digital value upon detection of an edge of a data window immediately following a delayed data pulse.

17. The apparatus of claim 16 wherein the means for charging the capacitor comprises a constant current source whereby the capacitor provides a linear ramping voltage signal level.

18. The apparatus of claim 16 including reset means for resetting a voltage on the capacitor following analog-to-digital conversion.

19. The apparatus of claim 18 wherein the reset means comprises steering logic for receiving data pulses and a switch connected between the capacitor and electrical ground.

20. The apparatus of claim 16 wherein the converter controller means includes means for generating data windows based upon data pulses using a phase-locked loop.

* * * * *

UNITED STATES PATENT AND TRADEMARK OFFICE
CERTIFICATE OF CORRECTION

PATENT NO. : 5,335,118
DATED : August 2, 1994
INVENTOR(S) : FORREST C. MEYER

It is certified that error appears in the above-indentified patent and that said Letters Patent is hereby corrected as shown below:

Col. 6, line 67, after "edge of a", insert --data--

Signed and Sealed this

Sixth Day of December, 1994

Attest:

BRUCE LEHMAN

Attesting Officer     Commissioner of Patents and Trademarks